United States Patent [19]
Iwashita

[11] Patent Number: 5,343,132
[45] Date of Patent: Aug. 30, 1994

[54] BACKLASH ACCELERATION CONTROL METHOD

[75] Inventor: Yasusuke Iwashita, Yamanashi, Japan

[73] Assignee: Fanuc Ltd., Yamanashi, Japan

[21] Appl. No.: 971,970

[22] PCT Filed: Jul. 6, 1992

[86] PCT No.: PCT/JP92/00852

§ 371 Date: Feb. 19, 1993

§ 102(e) Date: Feb. 19, 1993

[87] PCT Pub. No.: WO93/01534

PCT Pub. Date: Jan. 21, 1993

[30] Foreign Application Priority Data

Jul. 4, 1991 [JP] Japan .................. 3-189526

[51] Int. Cl.$^5$ .................................. G05B 11/01
[52] U.S. Cl. .................................. 318/630
[58] Field of Search .......................... 318/630

[56] References Cited

U.S. PATENT DOCUMENTS 5,015,935  5/1991  Iwashita ............... 318/630
5,204,602  4/1993  Iwashita ............... 318/630

FOREIGN PATENT DOCUMENTS

63-75907   4/1988  Japan .
63-308613 12/1988  Japan .
2-143605  12/1990  Japan .
2-309402  12/1990  Japan .
3-084603   4/1991  Japan .
3-110603   5/1991  Japan .

*Primary Examiner*—William M. Shoop, Jr.
*Assistant Examiner*—Karen Masih
*Attorney, Agent, or Firm*—Staas & Halsey

[57] ABSTRACT

A method for applying backlash acceleration correction at an optimum time preceding a reversal of velocity commands by a fixed time period, without being influenced by feed velocity or the like. A move command for a distribution period immediately preceding a present period is subtracted from a move command for a subsequent period to obtain an acceleration of the present period, the absolute value of the acceleration is multiplied by a constant K which is dependent on the frictional force of a machine, and the value obtained is stored in a register A. When a reversal of move commands occurs, backlash acceleration correction is initiated at a point of time when a velocity command corrected by a feedforward quantity FF has become equal to the value stored in the register A. Consequently, the backlash acceleration correction is initiated at a predetermined time before the reversal of sign of the velocity command.

4 Claims, 5 Drawing Sheets

BACKLASH ACCELERATION CONTROL METHOD

BACKGROUND OF THE INVENTION

Field of the Invention

This invention relates to a method of controlling a servomotor for actuating a table of a machine tool, a robot arm or the like, and more particularly, to a backlash acceleration correction to be executed when the moving direction of the table or robot arm is reversed.

Description of the Related Art

In reversing the rotating direction of a servomotor for actuating a table feed shaft of a machine tool, a robot arm or the like, driven parts of the machine cannot be reversed at once due to the effects of the friction and the backlash of a feed screw or reduction gear. Thus, if the rotating direction of the servomotor is reversed while contouring operation is carried out with the machine tool or the robot arm is making circular movement, a swell is formed in the cut surface of a workpiece or in the locus of the robot arm.

For example, in the case of a circular cutting performed on a workpiece in a plane defined by two axes, i.e., X and Y axes, when driven to move from a state of the movement of which the X component and Y component are negative and positive respectively into another state of the movement of which both the X and Y components are negative, causing a transition from one quadrant to another, the cutting speed with respect to the Y axis remains the same, but, for the movement in the direction of the X axis, the position deviation becomes "0", and thus the torque command value becomes smaller. Since the rotation of the servomotor cannot be reversed at once due to friction and the movement of the table cannot be reversed at once due to the backlash of the feed screw for feeding the table, the movement of the workpiece in the X-axis direction will not be able to respond to the move command at once, thereby causing the delay of action. As a result, a swell will be formed on the circular surface to be cut.

To eliminate or lessen such a swell, the so-called backlash acceleration is applied, as disclosed in, e.g., Unexamined Japanese Patent Publication JP-A-4-8451, in which, when the moving direction is reversed, position backlash correction is carried out on a position deviation, and when the position deviation is reversed, an appropriate value (acceleration value) is added to a velocity command to accelerate the servomotor in the reverse direction, thereby reducing a swell caused by quadrant change.

Further, in servomotor systems for machine tools, feedforward control is employed to reduce the amount of position deviation. Especially, in carrying out high-speed cutting with a machine tool, a shaping error occurs due to a follow-up delay of the servo system. To lessen the shaping error, a feedforward control method has been developed, as proposed by the applicant of the present application in International Patent Application No. PCT/JP91/01537, in which a smoothing processing is executed on a move command output from a numerical control device to obtain a feedforward quantity; the feedforward quantity is then added to a velocity command from a position loop, which is obtained by multiplying the position deviation by a position gain, to obtain a corrected velocity command, and the processing of a velocity loop is executed by using the corrected velocity command.

Figure 4:
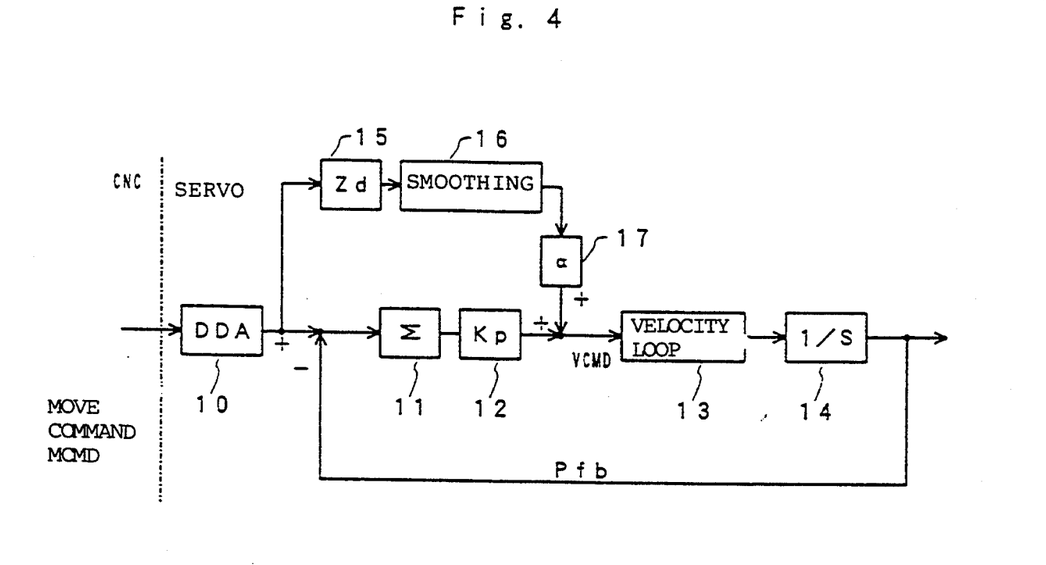
FIG. 4 (PRIOR ART) is a block diagram of a servo system for executing feedforward control.

This type of feedforward control will be described with reference to FIG. 4 (PRIOR ART). A DDA (digital differential analyzer) 10 divides a move command Mcmd, which is outputted from a CNC (computer numerical control) device in every distribution period, into move commands for respective position/velocity loop processing periods. An error counter 11 adds up the values obtained by subtracting a position feedback quantity Pfb from the move command outputs delivered by the DDA 10 to obtain a position deviation. An element 12 calculates a velocity command by multiplying a position gain Kp by the position deviation stored in the error counter 11. Reference numeral 13 denotes a velocity loop term, in which a velocity loop processing is executed based on the velocity command to obtain a torque command in a conventional manner, and a servomotor is driven in accordance with the torque command. Reference numeral 14 denotes an integral term, in which the velocity of the servomotor is integrated to obtain a servomotor position. Lead module 15 is a term for carrying out feedforward control and advances the move command, an output from the DDA 10, by a period d of the position/velocity loop processing period. A smoothing circuit 16 computes a means value, and a term 17 is for obtaining a feedforward quantity by multiplying the output value of the smoothing processing by a feedforward coefficient $\alpha$.

The feedforward quantity is then added to the velocity command, which is obtained by multiplying the position deviation by the position gain Kp, to obtain a velocity command Vcmd corrected through the feedforward control, and the processing of the velocity loop is executed by using thus obtained velocity command Vcmd.

In controlling a servomotor with the servo system described above, if the feedforward coefficient $\alpha$ is close to "1," most part of the velocity command Vcmd derives from the feedforward control, and the position deviation becomes nearly "0". Further, since the phase of the feedforward-based command is advanced, the phase of the position deviation will be delayed. If the feedforward coefficient $\alpha$ is close to "1," delay of the motor position with respect to the move command becomes almost zero. Consequently, it is difficult to determine based on the position deviation the time for the backlash acceleration correction coinciding with the time of reversal of the moving direction due to that the position deviation is nearly "0" and due to the phase lag. Further, since the delay of the actual motor position with respect to the move command is nearly zero, and the distribution period of the CNC is relatively long (usually, the distribution period is longer than the position/velocity loop processing period), if the backlash acceleration correction is initiated at the time of reversal of the position deviation, the time for initiating the backlash acceleration correction is subject to variation because of difference in the start position of a machining program.

Also, as for this type of feedforward control, the applicant of the present application has proposed a backlash acceleration control method for reducing the swell occurring due to the quadrant change in International Patent Application No. PCT/JP92/00666. In this method, the backlash acceleration correction is initiated when the feedforward quantity changes from positive to negative or vice versa, or when the velocity command obtained by adding the feedforward quantity to the product of the position deviation and the position gain changes from positive to negative or vice versa. Even with this method, the backlash acceleration correction will not work effectively in the case of high-speed movement along a circle with a small radius.

SUMMARY OF THE INVENTION

An object of this invention is to provide a method for effectively carrying out backlash acceleration correction by initiating it at a predetermined time before an actual reversal of direction, without regard to various conditions such as velocity, circle radius or the like.

The method according to this invention comprises the steps of: obtaining an acceleration according to move commands when the direction of a move command of a present period and the direction of a move command of a subsequent period are in a reverse relationship; and initiating a backlash acceleration correction at an instant when a value proportional to the acceleration coincides with the value according to a velocity command.

DETAILED DESCRIPTION OF THE PREFERRED EMBODIMENTS

Figure 6:
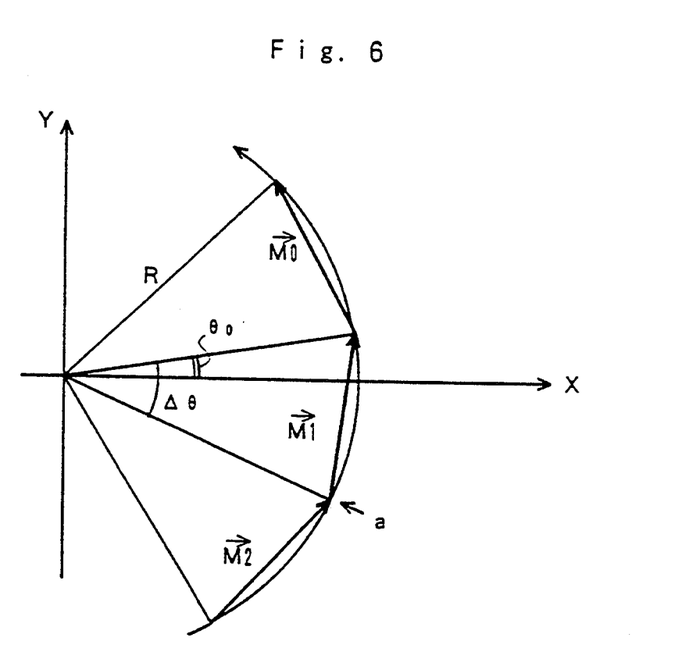
FIG. 6 is a diagram illustrating the operation principle of this invention.
Figure 7:
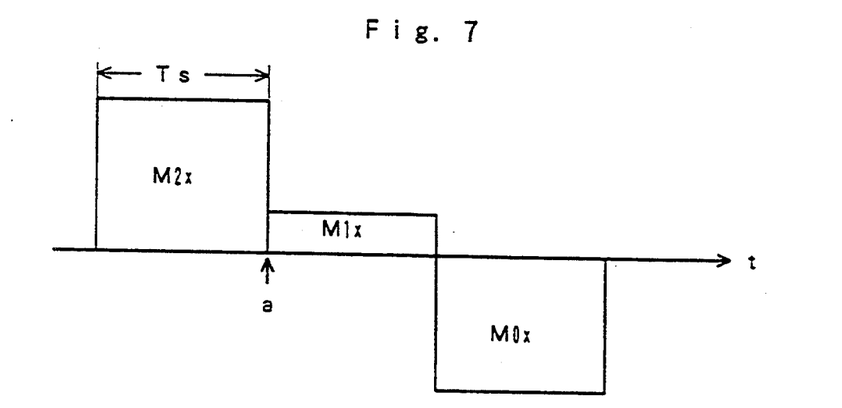
FIG. 7 is a diagram illustrating move commands in the X-axis direction shown in FIG. 6.
Figure 8:
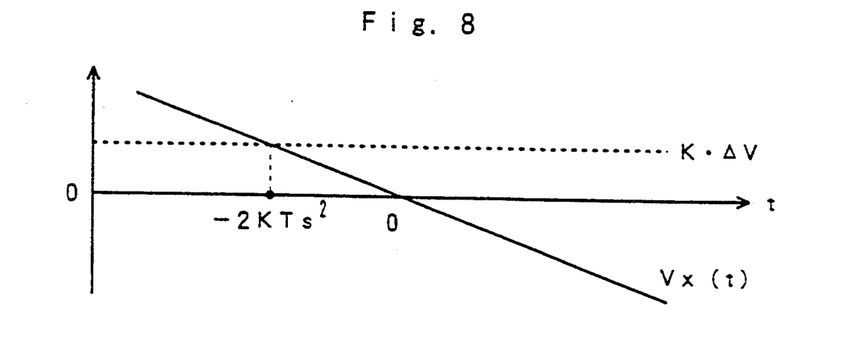
FIG. 8 is a graph showing a point of time at which the backlash acceleration correction is initiated.

Referring first to FIGS. 6 to 8, the operation principle of this invention will be explained. In FIG. 6, a move command of an immediately preceding distribution period is indicated by a vector M2, a move command of a present distribution period by a vector M1, and a move command of a subsequent distribution period by a vector M0, where it is assumed that a circular movement is under way. In this case, the X-axis components (move commands for a servomotor of the X axis) of the vectors M0, M1 and M2 are represented by M0x, M1x and M2x, respectively. Assuming that the move commands are distributed as shown in FIG. 7, the absolute value of an acceleration in the X-axis direction at the start point a of the present period can be obtained by calculating $|M0x - M2x|$.

Provided that the radius of the circle is R (mm) and the feed rate is F (mm/min), an angle $\Delta\theta$ over which the movement progresses during one distribution period Ts (sec) can be expressed as $$\Delta\theta = F \cdot Ts/(60R) \text{ (rad)}$$

Further, since $$M0x = R\{\cos(\theta o + \Delta\theta) - \cos\theta o\}$$

$$M2x = R\{\cos(\theta o - \Delta\theta) - \cos(\theta o - 2\Delta\theta)\}$$

where $-\Delta\theta/2 < \theta o < \Delta\theta$, the acceleration $\Delta V$ can be given as $$\begin{aligned} \Delta V &= |M0x - M2x| \\ &= 4R \cdot \sin(\Delta\theta/2) \cdot \sin\Delta\theta \cdot \cos\{\theta_o - (\Delta\theta/2)\} \end{aligned}$$

Assuming that the value $\Delta\theta$ is very small relative to "1", $\sin(\Delta\theta/2)$, $\sin\Delta\theta$ and $\cos\{\theta o-(\Delta\theta/2)\}$ can respectively be approximated to $\Delta\theta/2$, $\Delta\theta$, and "1". Thus, the acceleration $\Delta V$ can be given as $$\begin{aligned} \Delta V &= |M0x - M2x| \\ &= (2/R) \cdot (F \cdot Ts/60)^2 \text{(mm)} \end{aligned} \quad (1)$$

On the other hand, the move command x(t) in the X-axis direction is expressed as $$x(t) = R \cdot \cos\{F \cdot t/(60R)\}$$

where t represents time, and it is assumed that the moving direction is reversed when $t=0$.

The velocity command Vx(t) is obtained by differentiating the move command x(t) as follows:

$$\begin{aligned} Vx(t) &= (d/dt)x(t) \\ &= -R \cdot \{F/(60R)\} \cdot \sin\{F \cdot t/(60R)\} \end{aligned}$$

Thus, in the proximity of $t=0$ at which the direction is reversed, $\sin\{F \cdot t/(60R)\}$ can be approximated to $(F \cdot t/60R)$, and the velocity command Vx(t) can therefore be expressed as follows:

$$Vx(t) = -(1/R) \cdot (F/60)^2 \cdot t$$

Accordingly, if the backlash acceleration correction is initiated at a point of time when the velocity command Vx(t) becomes equal to the product of the acceleration $\Delta V$ and a constant K, which is dependent on the friction, as shown in FIG. 8, then $$Vx(t) = K \cdot \Delta V \quad (2)$$

Therefore, $$-(1/R) \cdot (F/60)^2 \cdot t = K \cdot (2/R) \cdot (F \cdot Ts/60)^2,$$

namely, $$t = -2KTs^2.$$

Thus, the time for initiating the backlash acceleration correction, $t = -2KTs^2$, becomes no longer dependent upon the radius R and the feed velocity F, and the acceleration start time becomes constant.

Figure 5:
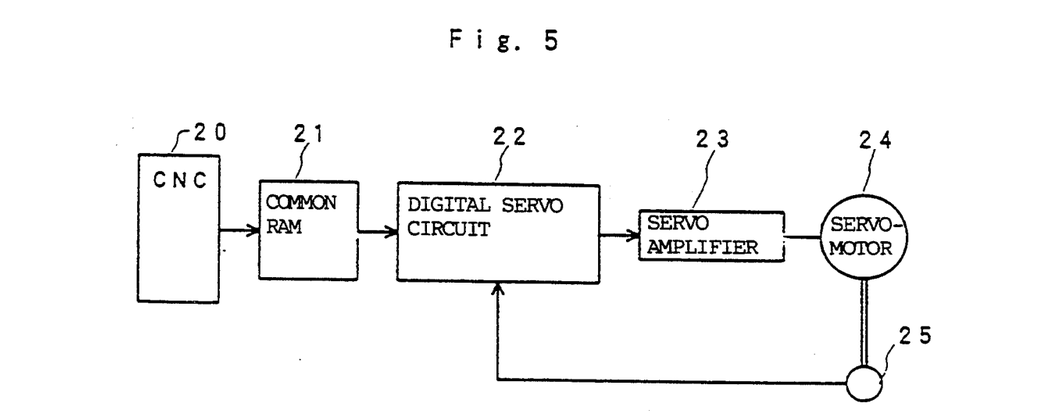
FIG. 5 is a block diagram showing a principal part of servomotor control for executing this invention.

Referring now to FIG. 5, a servomotor control device for a machine tool or robot, to which the method according to this invention is applied, will be described.

In FIG. 5, various commands for a servomotor 24, outputted from a CNC device 20, are transferred to a processor of a digital servo circuit 22 via a common memory 21. The digital servo circuit 22 comprises a CPU, a ROM, a RAM, etc., and the CPU controls the position, velocity and current of the servomotor 24. A servo amplifier 23 comprises a transistor inverter etc., and drives the servomotor 24. A pulse coder 25 detects the rotational position of the servomotor 24, and feeds the detected position back to the digital servo circuit 22.

Figure 1:
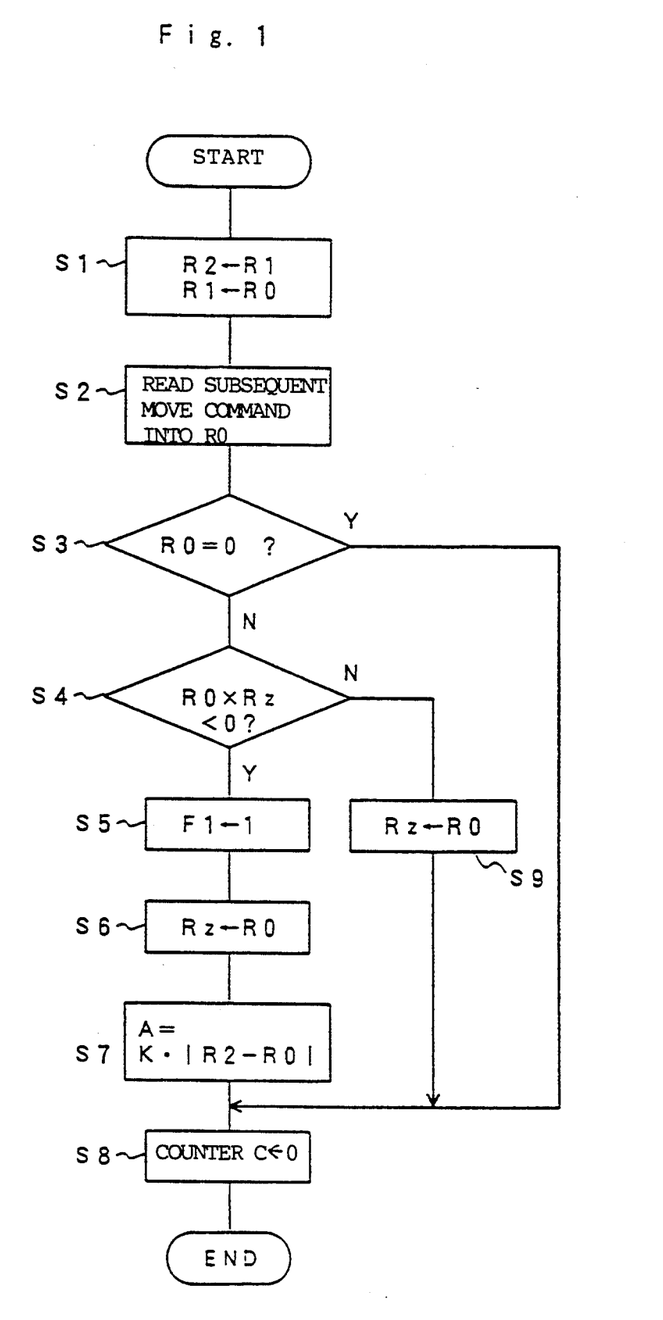
FIG. 1 is a flowchart of a processing executed by a processor of a digital servo circuit in each distribution period in executing feedforward and backlash acceleration correction according to this invention.
Figure 2:
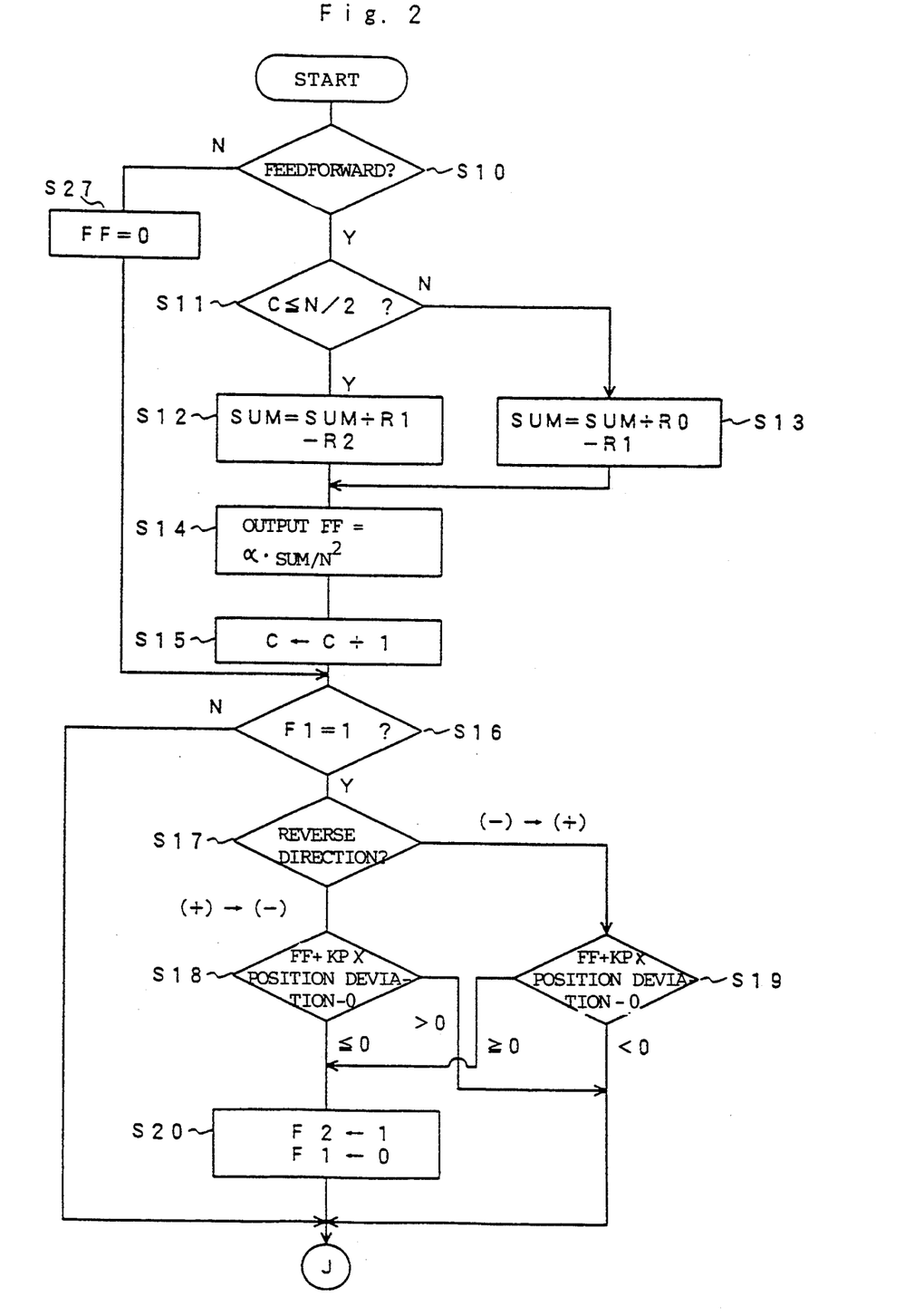
FIG. 2 is a part of a flowchart of a feedforward and backlash acceleration correction processing, which is executed by the processor of the digital servo circuit in each position/velocity loop processing period.
Figure 3:
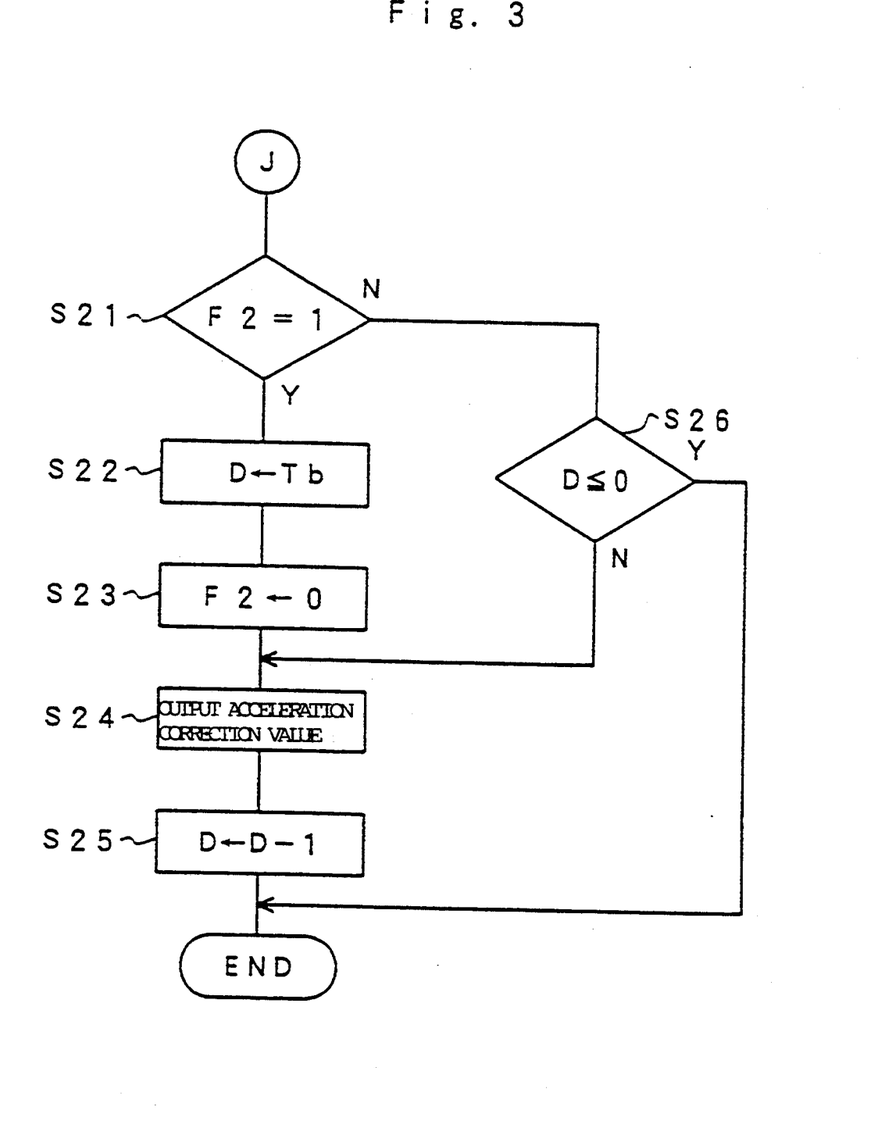
FIG. 3 is the remainder part of the flowchart shown in FIG. 2.

FIGS. 1, 2 and 3 are flowcharts of a feedforward processing and backlash acceleration correction executed by the CPU of the digital servo circuit 22. FIG. 1 shows a processing executed in every distribution period, and FIGS. 2 and 3 show the feedforward processing and backlash acceleration correction executed in every position/velocity loop processing period. Description of the processings other than the feedforward processing and the backlash acceleration correction are omitted here, since they are similar to conventional ones.

First, whether or not the feedforward control should be rendered effective is set by means of the CNC device 20 in accordance with a machining operation to be carried out, and upon start of the operation, the CPU of the digital servo circuit 22 executes the processing shown in FIG. 1 in every distribution period.

First, in Step S1, the move command for a distribution period immediately preceding (one period before) a present distribution period, stored in a register R1, is loaded in a register R2, and the move command for the present distribution period (the period in which the move command for executing the position/velocity loop is outputted), stored in a register R0, is loaded in the register R1.

Then, in Step S2, a move command Mcmd for a subsequent distribution period (one distribution period after that in which the position/velocity loop processing is executed) is read and stored in the register R0.

In Step S3, it is determined whether or not the move command Mcmd of the subsequent period, stored in the register R0, is "0"; if the move command Mcmd is "0", the program proceeds to Step S8 described later, and if the move command Mcmd is not "0", the program proceeds to Step S4. In Step S4, the product of the move command Mcmd, read in the present period and stored in the register R0, and the move command which has been read one period before the present period and stored in a register Rz, is obtained, and it is then determined whether or not the obtained product is negative. That is, it is determined whether or not there has been a change in the sign, from positive to negative or vice versa, between the move command Mcmd of the subsequent period and the move command for the present position/velocity loop processing. The register Rz is first set to "0" by initialization.

If the above product is negative, a flag F1 is set to "1" to indicate that sign of the subsequent move command will be reversed, in Step S5, and then in Step S6, the move command of the subsequent period, stored in the register R0, is loaded in the register Rz.

In Step S7, the absolute value of a difference obtained by subtracting the move command of the subsequent period, stored in the register R0, from the move command of the preceding period, stored in the register R2, is multiplied by a preset constant K (which is set in advance in accordance with the friction of the machine), and the value obtained is stored in a register A.

More specifically, the calculation of the aforementioned expression (1) is carried out to obtain an acceleration ΔV, and the product of the acceleration and the constant K is stored in the register A. Finally, in Step S8, a counter C is set to "0", and the processing for the present distribution period is ended.

If the product obtained in Step S4 is not negative (if there has been no change of sign between the move commands concerned), the program proceeds from Step S4 to Step S9, without setting the flag F1 to "1," and the move command of the subsequent period, stored in the register R0, is loaded in the register Rz. Finally, in Step S8, the counter C is set to "0", and the processing for the present period will be ended.

The CPU of the digital servo circuit executes the above-described processing at intervals of the distribution period, whereby the registers R2, R1 and R0 are successively loaded with a move command of the immediately preceding period, a move command of the period for executing the position/velocity loop processing, and a move command of the subsequent period, respectively, and the flag F1 is set to "1" in the case of a reversal of the sign of the move command Mcmd.

The CPU of the digital servo circuit also executes the processing shown in FIGS. 2 and 3 at intervals of the position/velocity loop processing period.

In Step S10, it will be judged whether or not rendering the feedforward processing effective has been preset. If the feedforward processing has been rendered effective, it is determined in Step S11 whether or not the value of the counter C registers a value smaller than or equal to $\frac{1}{2}$ of the value N obtained by dividing the distribution period by the position/velocity loop processing period, i.e., N=(distribution period)/(position/velocity loop processing period). If the value of the counter C is smaller than or equal to N/2, a value obtained by subtracting the value in the register R2 from the value in the register R1 is added to the value in an accumulator SUM in Step S12, and the program proceeds to Step S14. If the value of the counter C is greater than N/2, a value obtained by subtracting the value in the register R1 from the value in the register R0 is added to the value in the accumulator SUM, in Step S13, and the program proceeds to Step S14. At first, the accumulator SUM is set to "0" by initialization.

In Step S14, a value obtained by dividing the value of the accumulator SUM by the square of the above-mentioned value N is multiplied by a feedforward coefficient α to obtain a feedforward quantity FF, which will be then outputted. More specifically, the feedforward quantity FF is added to a value, which is obtained by multiplying the position deviation by a position gain Kp as in an ordinary position loop processing, to obtain a velocity command Vcmd corrected by the feedforward quantity FF, and a velocity loop processing similar to a conventional one will be executed by using the thus-corrected velocity command Vcmd. Then, in Step S15, "1" is added to the value in the counter C.

The aforementioned Steps S11 to S15 constitute the processing for obtaining the feedforward quantity FF. It is to be noted that this embodiment is concerned with a case where the quantity of advance implemented by the lead module 15 in the feedforward processing is set to $\frac{1}{2}$ of the distribution period, and this type of feedforward processing is described in detail in International Patent Application No. PCT/JP92/00666 mentioned above.

Subsequently, in Step S16, it is determined whether or not the flag F1 is "1." If the flag F1 has not been set to "1" in Step S5 (if there is no change of sign between the move commands concerned), the program proceeds from Step S16 to Step S21, whereupon it is determined whether or not a flag F2 is "1". If the flag F2 is not "1", it is determined in Step S26 whether or not the value of a counter D, which measures a backlash acceleration time, is "0", and, if the value of the counter D is smaller than or equal to "0" (the value of the counter D, is "0" unless a backlash acceleration command has been outputted, as mentioned later), the feedforward processing and backlash processing will be ended.

If the value in the register R0 storing the subsequent move command Mcmd has a different sign from the move command stored in the register Rz (i.e., the move command for the present position/velocity loop processing), and thus the flag F1 has been set to "1" in Step S5, the program proceeds from Step S16 to Step S17, whereupon it is determined whether the reversal of the sign is from positive to negative or vice versa depending on whether the move command stored in the register RO is negative or positive. If the reading of the register RO is negative, it is concluded that the sign has changed from positive to negative, and the program proceeds to Step S18. Whereas if the value of the register RO is positive, the program proceeds to Step S19.

Then, in Step S18, the product of the position deviation and the position gain Kp is added to the feedforward quantity FF calculated in Step S14, the product of the absolute value of the acceleration, stored in the register A, and the multiplier K is subtracted from the first obtained value; and it is determined whether or not the result has a value equal to or smaller than "0". That is, it is determined whether or not the velocity command obtained by correcting the feedforward quantity has become equal to the value obtained in Step S7, and this determination processing corresponds to the determination by aforementioned equation (2).

If the velocity command is not equal to the value stored in the register A, and thus it is determined in Step S18 that the value is greater than "0", the program proceeds to Step S21, and the above-described processing will be executed without initiating the backlash acceleration correction. If it is determined in Step S19 that the value obtained by adding the value of the register A to the velocity command corrected by the feedforward quantity is negative (this determination also corresponds to the equation (2), and is applied when the move command has changed from negative to positive, and thus the velocity command is first negative; and the backlash acceleration correction start time coincides with the point of time at which the sum of this velocity command and the value of the register A becomes equal to "0"), the program proceeds from Step S19 to Step S21, and the backlash acceleration correction will not be initiated.

Even in the case where the sign of the subsequent move command is reversed, the velocity command obtained by correcting the feedforward quantity FF will not immediately become reversed. As is clear from the processing in Step S12, the move command of which the sign is reversed will not affect the calculation of the feedforward quantity FF before the lapse of N/2, which is based on the position/velocity loop processing period and corresponds to half the distribution period. Thus, at least during the period N/2 based on the position/velocity loop processing period, neither the sign of the feedforward quantity FF not the sign of the velocity command obtained through correction of the feedforward quantity will be reversed. Consequently, the backlash acceleration correction will not be initiated.

If, however, it is detected in Step S18 or S19 that the velocity command corrected by the feedforward quantity FF has become equal to the value stored in the register A, the flag F2 is set to "1", and the flag F1 is set to "0" (Step S20). The program then proceeds from Step S20 to Step S21. Since the flag F2 has been set to "1", the program proceeds from Step S21 to Step S22, whereupon a value Tb corresponding to the backlash acceleration correction time set in the counter D will be set. Then, in Step S23, the flag F2 will be set to "0".

In Step S24, a set backlash acceleration correction value is outputted, whereby this backlash acceleration correction value is added to the velocity command Vcmd corrected by the feedforward quantity FF, and in Step S25, "1" is subtracted from the value of the counter D, followed by termination of the feedforward control and backlash acceleration correction control for the present period.

In the subsequent position/velocity loop processing periods, since the flags F1 and F2 are both set to "0", steps S11 to S15, S16 and S21 will be executed, and the program proceeds to Step S26. Then, Steps S24 and S25 for the backlash acceleration correction will be until the value of the counter D becomes "0", i.e., until the set backlash acceleration correction time elapses. After the value of the counter D has become "0", the backlash acceleration correction will not be carried out thereafter.

When the presetting for invalidating the feedforward processing has been made, the program proceeds from Step S10 to Step S27, whereupon the feedforward quantity FF is set to "0". The program then proceeds to Step S16 to execute Step S16 and the steps subsequent thereto, and in this case, the feedforward processing in Steps S11 to S15 will not be carried out.

While the above-described processing is repeated, the backlash acceleration correction is started at a point of time when the value dependent on the machine's frictional force proportional to the acceleration according to a command whose direction is reversed becomes coincident with the value according to the velocity command, whereby the backlash acceleration correction can be initiated accurately at a fixed time preceding the reversal of direction. Thus, the backlash acceleration correction effectively works even in the case of high-speed movement along a circle with a small radius, without regard to the circle radius or the feed velocity commanded by move commands.

What is claimed is:

1. A backlash acceleration control method designed to be applicable when a direction of movement of a machine driven by a servomotor is reversed, comprising the steps of:
   obtaining an acceleration of a servomotor driving a machine based on move commands distributed from a numerical control device at a time when a direction of movement of said servomotor based on one of said move commands of a present distribution period of said numerical control device and a direction of movement of said servomotor based on one of said move commands of a subsequent distribution period to said present distribution period are in a reverse relationship; and applying a backlash acceleration correction to said servomotor at a point of time when a value proportional to said obtained acceleration equals a velocity command.

2. A backlash acceleration control method designed to be applicable when a direction of movement of a machine driven by a servomotor is reversed, comprising the steps of:

obtaining a feedforward quantity by executing a smoothing processing to obtain a mean value of move commands distributed from a numerical control device for a plurality of position/velocity loop processing periods which include a present period and several periods before and after the present period;

obtaining a corrected velocity command based on said obtained feedforward quantity, and controlling a servomotor in accordance with the obtained corrected velocity command;

obtaining an acceleration of the servomotor driving a machine based on said move commands distributed from said numerical control device when a direction of movement of said servomotor based on one of said move commands of a present distribution period of said numerical control device and a direction of movement of said servomotor based on one of said move commands of a subsequent distribution period to said present distribution period are in a reverse relationship; and applying a backlash acceleration correction to said servomotor at a point of time when a value proportional to the obtained acceleration equals the obtained corrected velocity command.

3. A backlash acceleration control method according to claim 2, wherein the step of obtaining a feedforward quantity by executing a smoothing processing includes the step of obtaining said mean value of move commands for a number of said plurality of position/velocity loop processing periods including said present period and several periods before and after the present period, said number of said plurality of position/velocity loop processing periods corresponding to a distribution period of the move commands distributed from said numerical control device.

4. A backlash acceleration control method according to claim 3, wherein the step of obtaining a feedforward quantity includes the step of multiplying a feedforward coefficient by the mean value of move commands obtained by the smoothing processing.

* * * * *